United States Patent [19]

Hoemann

[11] Patent Number: 4,990,756
[45] Date of Patent: Feb. 5, 1991

[54] APPARATUS AND METHOD FOR EMULATING BAR CODES

[75] Inventor: James D. Hoemann, Englewood, Colo.

[73] Assignee: Telsor Corporation, Englewood, Colo.

[21] Appl. No.: 224,561

[22] Filed: Jul. 25, 1988

[51] Int. Cl.$^5$ ............................ G06K 7/08; G06K 7/01
[52] U.S. Cl. ................................... 235/462; 235/439; 235/375
[58] Field of Search ............... 235/375, 380, 419, 435, 235/439, 462, 449, 463, 466, 472; 340/825.30, 825.34

[56] References Cited

U.S. PATENT DOCUMENTS

| | | | |
|---|---|---|---|
| 4,333,072 | 6/1982 | Beigel | 235/449 |
| 4,415,065 | 11/1983 | Sandstedt | 235/383 |
| 4,440,248 | 4/1984 | Teraoka | 235/462 |
| 4,600,829 | 7/1986 | Walton | 340/825.34 |
| 4,661,691 | 4/1987 | Halpern | 235/449 |
| 4,663,625 | 5/1987 | Yewen | 235/439 |
| 4,736,096 | 4/1988 | Ushikubo | 235/419 |
| 4,791,283 | 12/1988 | Burkhardt | 235/449 |

FOREIGN PATENT DOCUMENTS 62-5431 1/1987 Japan.

OTHER PUBLICATIONS

Description and Operating Instructions for the Sumbollink TM LL-310 Wand Emulator Interface Controller, Symbol Technologies, Inc., 1986.

Primary Examiner—Stuart S. Levy
Assistant Examiner—Robert Weinhardt
Attorney, Agent, or Firm—Sheridan, Ross & McIntosh

[57] ABSTRACT

An apparatus is provided that includes a bar code emulator for translating an RF carrier signal modulated, preferably, using the American Standard Code for Information Interchange (ASCII) symbology into a signal suitably formatted for input to a standard bar code decoder. A sensor interface is included in the bar code emulator for demodulating the RF signal. A control interface is included for specifying the format of the resulting signals. A processor translates the ASCII symbols according to the format specified at the control interface. The resulting signals are output on a decoder interface that communicates with the standard bar code decoder.

41 Claims, 14 Drawing Sheets

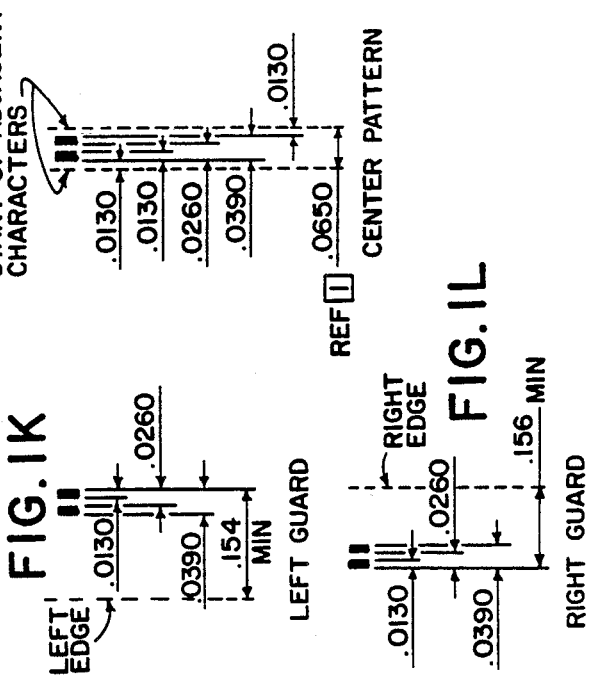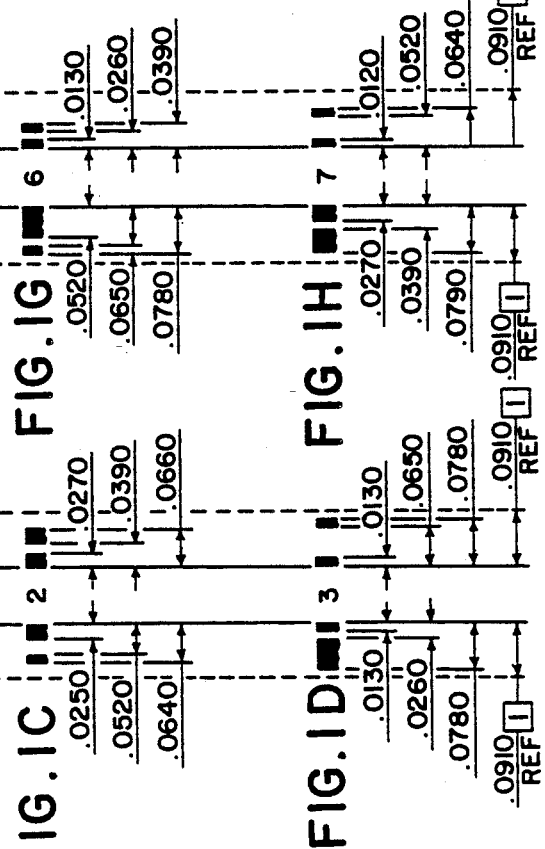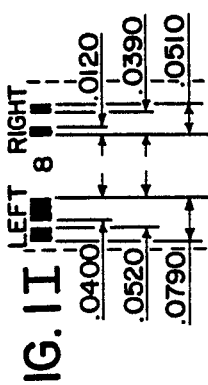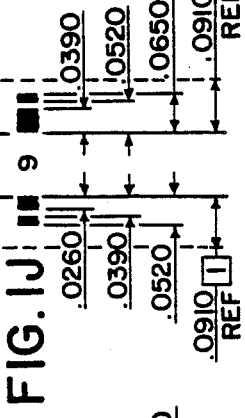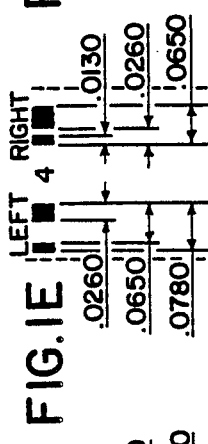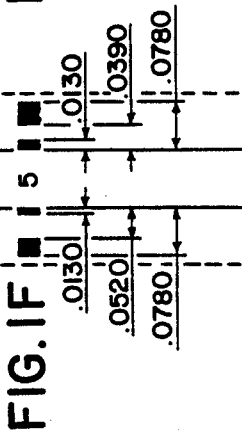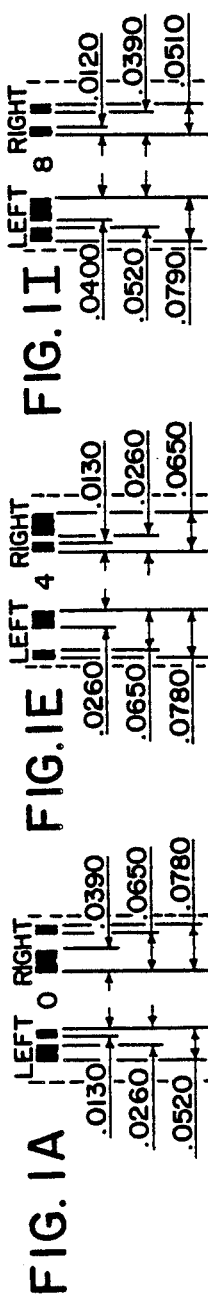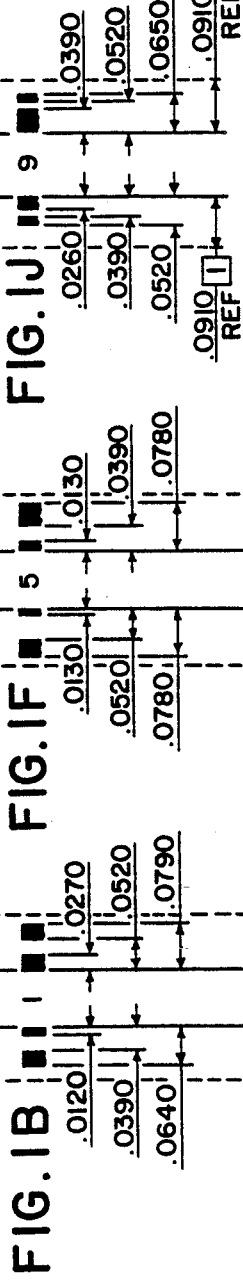

FIG. 6

| ASCII CHARACTER | HEX VALUE | ASCII CHARACTER | HEX VALUE |
|---|---|---|---|
|  |  | @ | 40 |
| ! | 21 | A | 41 |
| " | 22 | B | 42 |
| # | 23 | C | 43 |
| $ | 24 | D | 44 |
| % | 25 | E | 45 |
| & | 26 | F | 46 |
| ' | 27 | G | 47 |
| ( | 28 | H | 48 |
| ) | 29 | I | 49 |
| * | 2A | J | 4A |
| + | 2B | K | 4B |
| , | 2C | L | 4C |
| - | 2D | M | 4D |
| . | 2E | N | 4E |
| / | 2F | O | 4F |
| 0 | 30 | P | 50 |
| 1 | 31 | Q | 51 |
| 2 | 32 | R | 52 |
| 3 | 33 | S | 53 |
| 4 | 34 | T | 54 |
| 5 | 35 | U | 55 |
| 6 | 36 | V | 56 |
| 7 | 37 | W | 57 |
| 8 | 38 | X | 58 |
| 9 | 39 | Y | 59 |
| : | 3A | Z | 5A |
| ; | 3B | [ | 5B |
| < | 3C | \ | 5C |
| = | 3D | ] | 5D |
| > | 3E | ^ | 5E |
| ? | 3F |  |  |

APPARATUS AND METHOD FOR EMULATING BAR CODES

A Microfiche Appendix accompanies this patent application and consists of 1 Microfiche and 13 Pages.

FIELD OF THE INVENTION

The present invention relates to an apparatus and method for emulating bar code signals in situations where it is impractical to detect a bar code with standard bar code reading devices, like light pens.

BACKGROUND OF THE INVENTION

An application of bar code symbology with which most consumers are familiar is the representation of a product id. Typically, when a consumer purchases a product the bar code word, a series of black and white bars that are representative of the product id, is detected by a laser system that communicates the product id to a computer system that in turn, supplies the price of the product.

A bar code symbology is set of symbols, similar to an alphabet, that can be combined to form words that represent information. Bar code symbols are composed of elements, black and white bars of varying width that absorb and reflect light, respectively. Numerous optical devices that take advantage of the varying reflectivity of the black and white bars have been developed to read bar code symbols. A typical bar code reading device is the light pen, which is comprised of a laser diode for directing a beam of light to the bar code symbol and a photodetector for generating a digital signal representative of the presence or absense of reflected light. Providing the bar code reading device moves across the bar code symbol at a relatively constant speed, the relative durations of the signals generated by the photodetector are representative of the relative widths of the black and white bars that comprise the bar code symbol. The absolute duration of the signals are dependent upon the speed with which the reading device scans the bar code symbol. The signal produced by the photodetector is input to a bar code decoder that translates the signal into a form that is acceptable to a computer. For the bar code decoder to translate the input signals into a format acceptable to a computer it must be designed according to the following three parameters that characterize the input signals: the bar code symbology being employed, the speed with which the reading device is scanning, and the polarity of the signals (e.g. whether a logical-zero signal is representative of a white bar or black bar). Based upon these three parameters the bar code decoder can be designed to translate the input signals into a form acceptable to the computer. Typically, the bar code decoder present in any given system is designed to process signals representative of symbols associated with one specific bar code symbology (there are several bar code symbologies in existence), signals whose absolute duration is defined by the particular scanning speed of the reading device employed in the system, and signals with a defined polarity.

A problem, however, arises when bar code symbols and the associated optical bar code reading devices are used in environments where there is a high concentration of particulates that tend to scatter or disperse the laser light beam used to detect the bar code symbol. Similarly, bar code symbols and optical readers cannot be used in situations where foreign objects are interposed between the reader and the bar code symbol thereby blocking the light beam.

Systems that avoid this problem include radio frequency identification (RFID) systems, which are substantially unaffected by the presence of foreign objects or particles. Representative of RFID systems are U.S. Pat. No. 4,333,072 to Beigel for an "Identification Device", U.S. Pat. No. 4,663,625 to Yewen for a "Passive Tag Identification System and Method" and the electronic label and sensor produced by Nedap. Typically, these RFID systems are comprised of a passive tag (i.e. without an independent power source) that contains the relevant information and a sensor that outputs a RF carrier signal. When the tag is brought near the sensor, inductive coupling occurs and the tag is powered by the RF carrier signal being emitted by the sensor. While the tag is active, it modulates the RF carrier with the information. A detector located in the sensor receives the modulated RF carrier signal. However, the modulated RF signals of such RFID systems are not in the digital format accepted by the standard bar code decoder.

A system is generally described in a publication entitled "Description And Operating Instructions For The Symbollink LL-310 Wand Emulator Interface Controller" of Symbol Technologies, Inc., for converting one form of bar code to another form of bar code. In this system, a laser beam is modulated using bars and spaces of the scanned symbol. According to the publication, the resulting digitized bar pattern is then decoded by a computer, using an algorithm, to a binary equivalent form from which a bar code representation can be generated that emulates the output of a manually scanned wand. This system, however, is not directed to converting a non-bar code symbology to a bar code symbology such as ASCII, and would appear not to utilize various other features found in the present invention.

SUMMARY OF THE INVENTION

The present invention includes a bar code emulator for translating an RF carrier signal that has been modulated, preferably using a symbology known as the American Standard Code for Information Interchange (ASCII), into a format suitable for use by a standard bar code decoder. The operation of the standard bar code decoder is defined by the bar code symbology being utilized by the system within which the bar code decoder resides. Furthermore, the standard bar code decoder is designed to process digital signals having defined absolute durations and a particular polarity.

The bar code emulator includes a sensor interface for demodulating the RF signal. The bar code emulator also preferably includes a control interface that allows an operator to specify the bar code symbology, polarity, and absolute duration of the signals to be produced by the bar code emulator for input to the standard bar code decoder. By including a control interface, the bar code emulator can be adapted to operate in several different systems.

The bar code emulator also includes a computer, preferably a programmed microprocessor, for translating the demodulated or ASCII signal presented at the sensor interface according to the parameters specified at the control interface. The resulting signals are output on a decoder interface that communicates with the standard bar code decoder.

Based on the foregoing summary, it is seen that there are a number of advantages to the present invention. A bar code emulator is provided for converting non-bar code information, such as represented in ASCII format, to bar code symbology that can be subsequently processed by conventional hardware and software. This system has desirable applicability in environments in which the use of a light beam or a laser is essentially inappropriate or practically unworkable. The bar code emulator communicates with an RF carrier, which is modulated by ASCII information, to avoid the inaccuracies introduced in an environment unsuitable for a laser or light beam input. Further, the present invention enables the user to control or simulate different wand speeds and different bar code symbologies preferably using look-up tables, to provide a high degree of user flexibility.

Additional advantages of the present invention will become readily apparent from the following discussion, particularly when taken together in conjunction with the accompanying drawings.

BRIEF DESCRIPTION OF THE DRAWINGS

FIGS. 1A-1M illustrate UPC bar code symbology;

FIG. 6 illustrates an abbreviated ASCII symbology;

DETAILED DESCRIPTION

A bar code symbology is an alphabet, just like the English alphabet or the base ten number system. An alphabet is comprised of symbols which, in turn, can be comprised of even more basic structures known as elements. Symbols, in turn, can be combined into words that represent information. For example, if springboard dives are scored using the base ten number system or symbology and the range of scores is limited to words of two symbols, i.e. 00 to 99, then a score of 19 would "represent" the "information" that a particular dive was "poor" whereas a score of 91 would indicate an extremely good dive. A bar code symbol is comprised of a series of vertical and parallel, black and white bars (spaces) or elements of varying width. By varying the width and ordering of the bars different symbols can be defined that, like with the base ten symbology, can be combined into words that represent information.

A typical application of bar code symbology, with which most consumers at a grocery check out line are familiar, is in representing product identificiation (id) codes. The bar code word, representing a product id, is typically detected or read by scanning the bar code word attached to the product using a laser system located at the check out counter. The detected bar code word can then be used to determine, among other things, the price of the product and delete a product unit from the inventory.

An advantage of using bar code symbology over, for example, the base ten number system is that it is relatively simple to build machinery that can detect and process bar code symbols whereas like operations involving base ten symbols generally require more complex machinery. In fact, the complexity associated with detecting and processing base ten symbology is such that it is generally done by human beings as opposed to machinery. Furthermore, bar code symbology lends itself to error checking schemes unlike base ten symbology which, due to the human factor, is more prone to errors.

Figure 2:
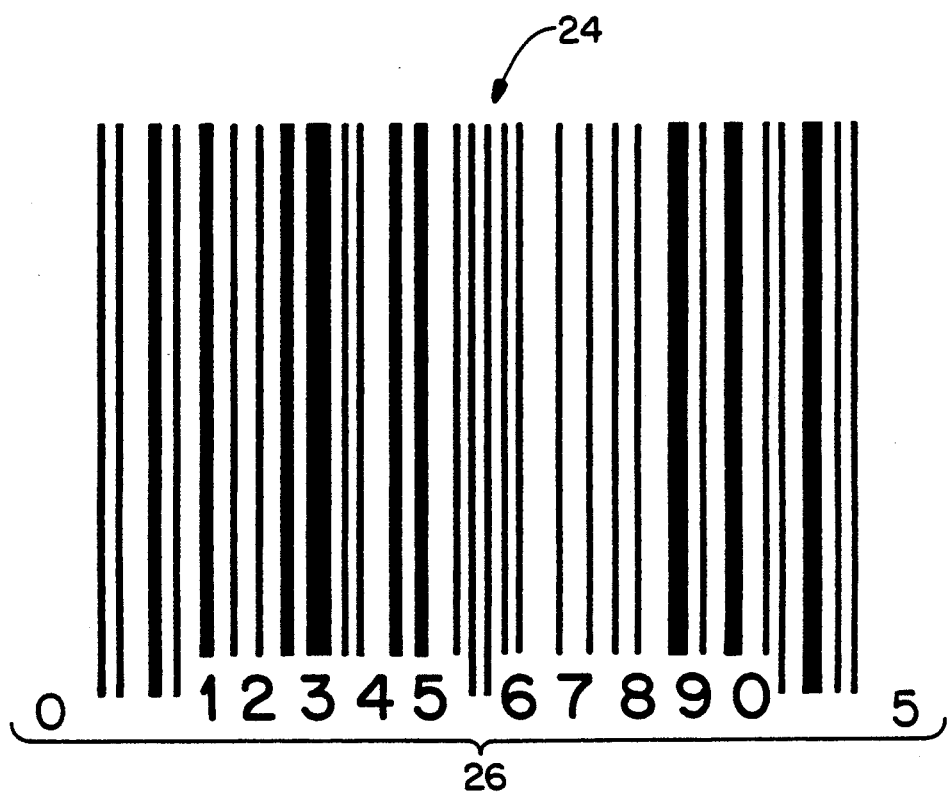
FIG. 2 illustrates the UPC bar code symbology representation of the product id "012345678905"
Figure 3:
FIG. 3 illustrates the signal produced by a light pen or other bar code symbology reading device when it scans the bar code symbology representation of the product id "012345678905" shown in FIG. 2.

Representative of bar code symbology is the Uniform Product Code (UPC) bar code shown in FIGS. 1A-1M. FIGS. 1A-1J illustrate the bar code symbols that correspond to the base ten symbols, 0 to 9. The elements, black and white bars of varying width, that comprise a bar code symbol vary according to whether the symbol is located to the left or right of the center symbol illustrated in FIG. 1M. For example, the UPC bar code symbol that corresponds to the base ten symbol "7" (see FIG. 1H), when located to the left of the center symbol has two relatively thick black bars and, when located to the right of the center symbol, has two relatively thin black bars. This variation produces an odd parity in the left half of a word and an even parity in the right half of a word that can be used to check for errors when reading the bar code representation. The UPC bar code symbology uses left and right guard symbols, as shown in FIGS. 1K and 1L, to define the beginning and end of a word. A UPC bar code word, excluding the guard and center symbols, is by definition twelve symbols or characters in length with the first symbol defining the version of the UPC code being used, the next ten symbols providing a product id, and the last symbol providing a modulo check character which is used in error checking. A bar code word 24, utilizing the UPC symbology to represent an arbitrary product id, UPC version number, and modulo check character is illustrated in FIG. 2 along with the equivalent base ten symbology representation 26 of the same information. If a light pen or wand were to scan the bar code word 24, a signal substantially similar to that shown in FIG. 3 would be output to a standard bar code decoder. The signal shown in FIG. 3 is comprised of logical-one and logical-zero signals with durations that correspond to the bar code widths of the bar code symbols comprising the word 24.

The applications of a usual bar code detection and processing system are limited to environments where there are relatively few particulates, such as smoke or dust, present to scatter the light beam used to read a bar code symbol. Consequently, in situations where there is a relatively high concentration of particulates, such as in a factory, the typical bar code detection and processing capability is severely diminished. Consequently, the progress of, for example, a product as it passes through various stages of manufacture in a dust filled factory cannot be monitored by the standard bar code detection and processing system.

Figure 4:
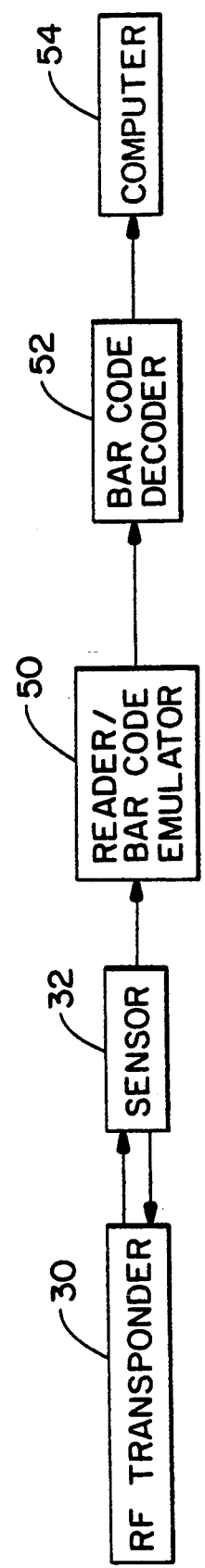
FIG. 4 is a block diagram illustrating the apparatus of the present invention for use in reading a product id.

With reference to FIG. 4, an apparatus is illustrated for reducing problems encountered in such environments. The system includes a radio frequency (RF) transponder 30 that is capable of transmitting information to a sensor 32 irrespective of the particulates in the environment. The RF transponder 30 containing the relevant information, a product id for example, is attached to the product or item that is to be monitored at various points in time. Typically the RF transponder 30 is a passive device, i.e. without an independent means of power, that is activated or powered by the radio frequency carrier emitted by the sensor 32 in a manner known in the art as inductive coupling.

Figure 5:
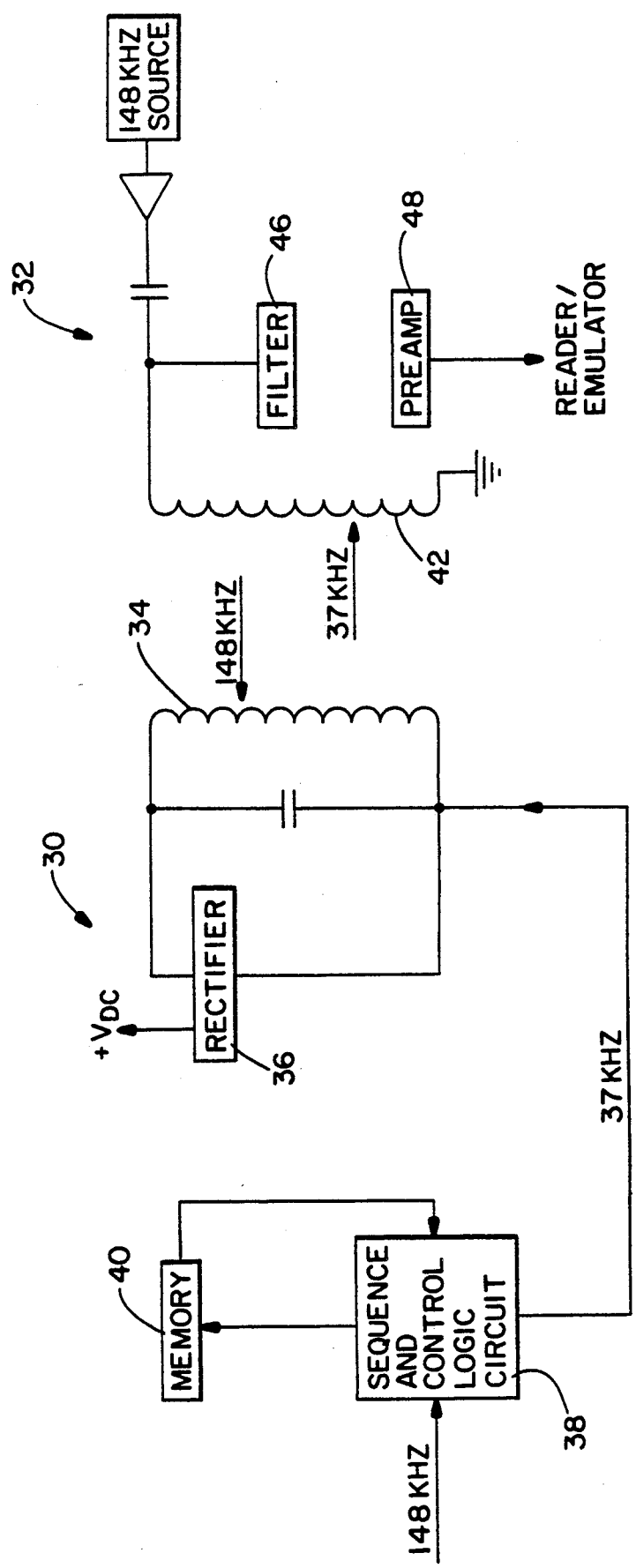
FIG. 5 is a circuit schematically illustrating the transponder and sensor.
Figure 7:
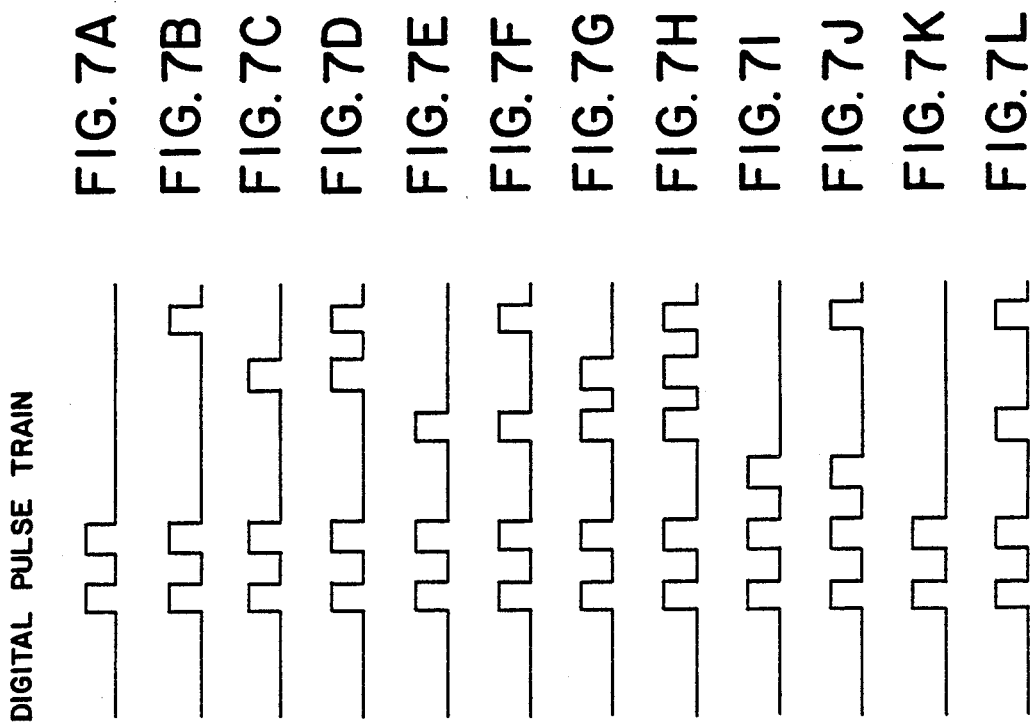
FIGS. 7A-7L illustrate the ASCII symbology representation in base 16, base 2 and as a digital signal for each numeral making up the product id "012345678905"

With reference to FIG. 5, one known embodiment of a transponder 30 and a sensor 32 is illustrated. The transponder 30 includes a coupler 34 for receiving the RF carrier output by the sensor 32. The coupler 34 includes a rectifier 36 for providing the transponder 30 with power. The transmitted signal received by the coupler 34 from the sensor 32 is also input to a sequence and control logic circuit 38. The circuit 38 divides down the frequency of the transmitted signal. In the preferred embodiment, the transmitted signal is a 148 kHz signal that is divided down to a 37 kHz signal. An output of the sequence and control logic circuit 38 is applied to a memory 40 that stores the information or words constituting the product id. The signal input to the memory 40 causes the information or data stored therein to be serially output to the sequence and control logic circuit 38. The information from the memory 40 mixes with the generated 37 kHz signal to produce a modulated 37 kHz signal that is output to the coupler 34 for transmission to the sensor 32. In a preferred embodiment, the 37 kHz signal is modulated at a 9.25 kbaud rate.

As also illustrated in FIG. 5, the sensor 32 includes a coupler element 42 that provides mutual inductive coupling with the coupler 34. The sensor 32 also includes a signal generator or oscillator 44 that acts as the source of the transmitted signal. The modulated signal received from the transponder 30 is input to a filter 46 and a preamp 48 of the sensor 32. The output of the preamp 48 is applied to a reader/bar code emulator 50, whose operation will be subsequently discussed.

Since the RF transponder 30 and the sensor 32 are coupled, changes in the operation of the RF transponder 30 affect the operation of the sensor 32. It is this causal relationship that allows the relevant information to be transferred from the RF transponder 30 to the sensor 32. For example, if the load presented by the RF transponder 30 to the sensor changes, then the radio frequency carrier output by the sensor 32 can be modulated accordingly. Therefore, if the load presented by the RF transponder to the sensor 32 can be varied in accordance with some symbology, then there is a way for transmitting the relevant information from the RF transponder 30 to the sensor 32. Unfortunately, developing hardware to vary the load of the RF transponder 30 according to all of the bar code symbologies would be extremely complex and costly. Consequently, one symbology must be adopted for varying the load of the RF transponder 30. Furthermore, the chosen symbology should be one from which equivalent bar code symbols can be readily derived.

A preferred symbology for representing information in the RF transponder 30 is, with reference to FIG. 6, a truncated version of the American Standard Code for Information Interchange (ASCII) which contains symbols that are composed of a predetermined number of elements of equal width or duration, known as bits, with each element having either a logical-zero or a logical-one state. The ASCII symbology is not a bar code symbology but, as will be shown later, lends itself to the production of equivalent bar code symbols for several different bar code symbologies. In one embodiment, instead of the conventional eight bits associated with the ASCII code, only six bits are utilized to define a character or byte and a product id is defined using sixteen or fewer characters. The six bit designation is achieved, with reference to FIG. 6, by subtracting twenty hexadecimal from the ASCII format illustrated and truncating the result to the six least significant bits.

FIGS. 7A-7L are exemplary of the operation of the RF transponder 30 when ASCII symbology is used. These figures illustrate various representations of the signals that the RF transponder 30 would use to vary the load and thereby modulate the RF carrier for the same product id information as that shown in FIGS. 2 and 3. Comparison of the digital pulse train produced by the ASCII symbology in FIGS. 7A-7L and the digital pulse train produced by the UPC bar code symbology for the same information, the product id, reveals substantial differences. The dissimilarities between the ASCII word and the UPC word for the same product id would prevent the ASCII word from being processed by a standard bar code decoder and computer.

A reader/bar code emulator 50 is provided to translate, for example, ASCII symbols or words to equivalent bar code symbols or words for use by a standard bar code decoder 52 and computer 54 in situations where the RF transponder 30 with ASCII information and the sensor 32 are employed. Preferably, the bar code emulator 50 can translate ASCII words into the corresponding words of several different bar code symbologies, vary the duration of the signals produced to simulate the passing of a light pen over a bar code word at different speeds, and change the polarity of the signals produced.

The bar code emulator 50 has two operational states. The first state is the power up or reset state where the state of the bar code emulator 50 is changed from an unknown or undesirable state to a defined state from which normal operation can take place. The second state is the normal or operational state where the bar code emulator 50 is translating ASCII symbols to bar code symbols according to various specified control parameters.

Figure 8:
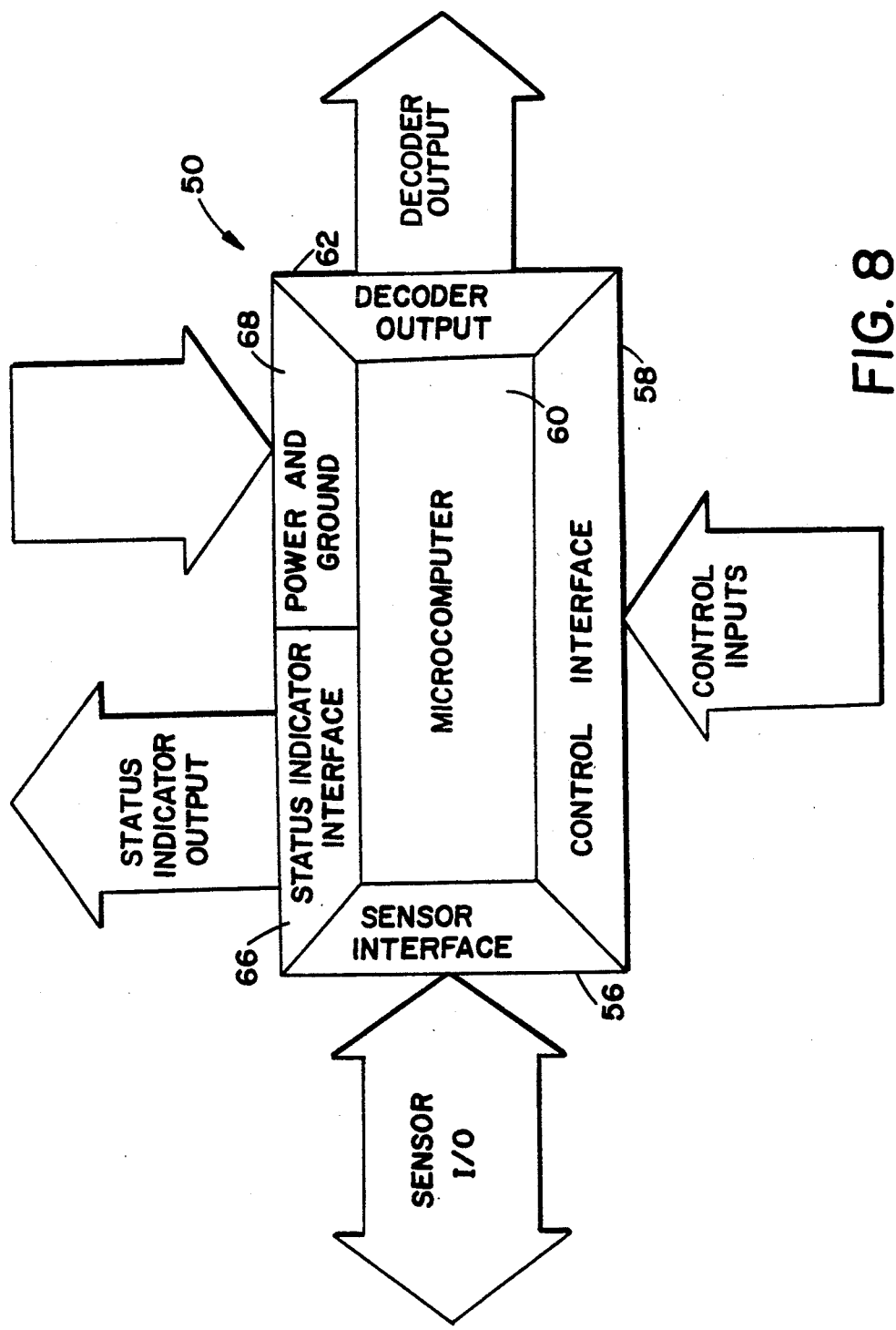
FIG. 8 illustrates the input and output interfaces associated with the reader/bar code emulator.
Figure 9:
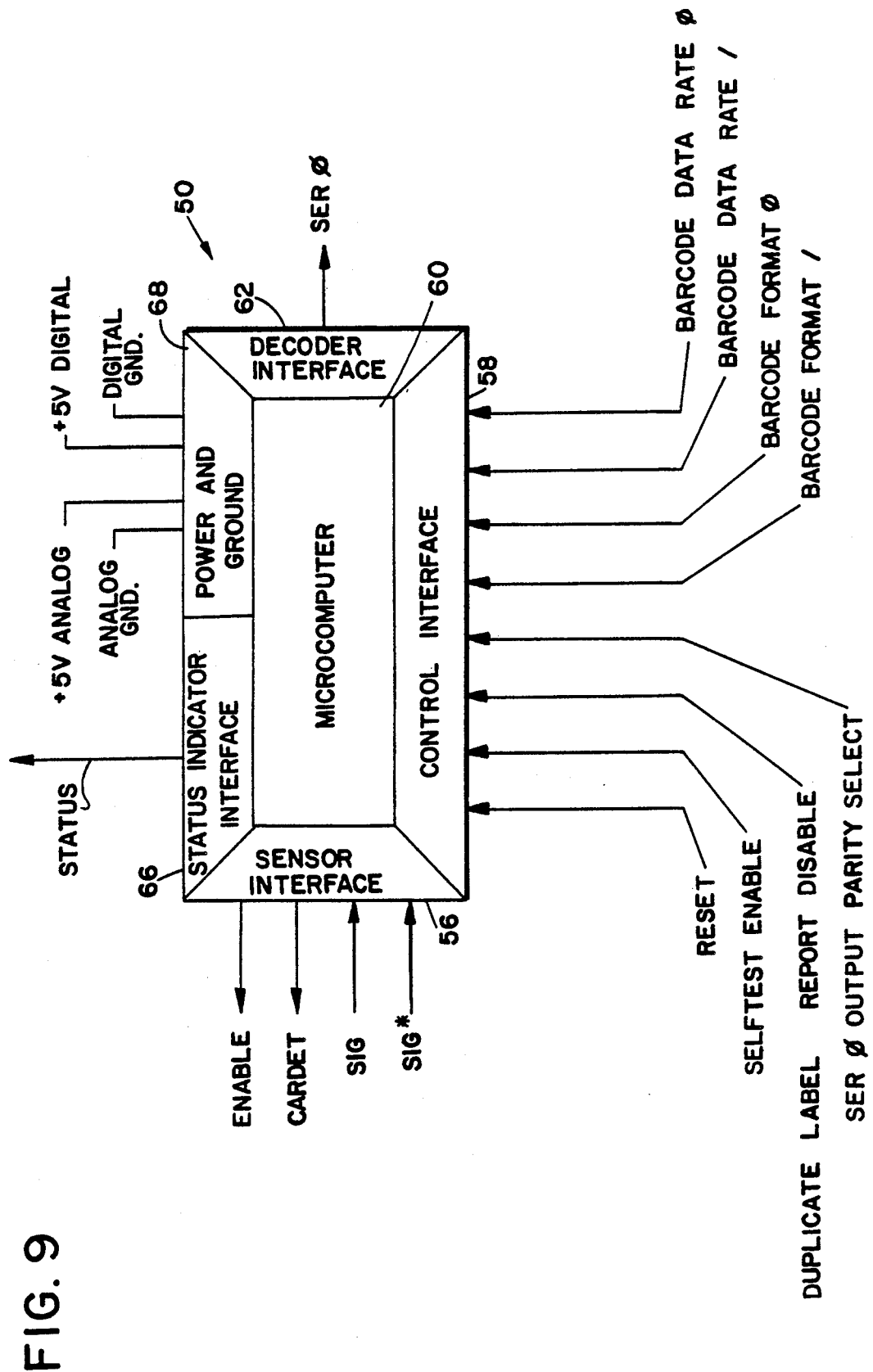
FIG. 9 expands upon FIG. 8 by identifying in greater detail the inputs and outputs associated with each interface of the bar code emulator.

With reference to FIGS. 8 and 9, the preferred embodiment of the bar code emulator 50 includes a sensor interface 56. Among the outputs from the sensor interface 56 is a CARDET output that is used during power up and resets of the bar code emulator 50 to test the connection between the sensor 32 and the bar code emulator 50. An ENABLE output is included in the sensor interface 56 for, among other things, resetting the sensor 32 during power up or reset. During normal operation, the ENABLE output is in a logical-zero state when the bar code emulator 50 is waiting to process an ASCII word and in a logical-one state while processing an ASCII word. The SIG-SIG* input pair carries the RF signal produced by sensor 32 and modulated by the ASCII symbol or word contained in the RF transponder 30. The ASCII symbol or word is recovered from the modulated RF carrier signal by a demodulator circuit (not shown) residing in the sensor interface 56 prior to further processing. Presently there is only one SIG-SIG* input pair, and therefore one sensor 32, associated with the bar code emulator 50. However, by varying the lengths of time that the ENABLE output is in a logical-zero or logical-one state, a multiplexing scheme using several sensors could be realized. For example, by holding the ENABLE output at a logical-one state for a specified amount of time, different than the time for resetting the sensor or the processing of an ASCII symbol, a multiplexer could be triggered to switch to a different sensor.

Included in the bar code emulator 50 is a control interface 58 that allows a user or operator to define, via switches (not shown), various parameters that determine the operation of the bar code emulator 50 during the reset and normal operation states. The RESET switch allows an operator to reset or place the bar code emulator 50 in a known or defined state from which normal operation can take place. During reset or power up, the bar code emulator performs internal self tests that verify the integrity of several of the components that comprise the bar code emulator 50. If, prior to the onset of a power up or reset, the operator activates the SELFTEST ENABLE switch, then the bar code emulator 50 will output a message (to be described later) on the decoder interface (that indicates, among other things, the results of the internal self tests.

The remaining inputs associated with the control interface 58 allow the operator to define parameters for the translation of ASCII symbols to bar code symbols. The BARCODE DATA RATE 0 and BARCODE DATA RATE 1 switches allow the operator to select from up to four apparent light pen or wand speeds: 4 in/s, 8 in/s, 16 in/s and 64 in/s. A greater number of light pen or wand speeds could be provided by increasing the number of data rate switches. The defined light pen or wand speed informs the bar code emulator 50 how fast the light pen being emulated would have scanned a bar code. Consequently, the bar code emulator 50 can properly defines the absolute duration of logical-zero and logical-one signals when it translates the ASCII symbols into bar code symbols.

That is, during standard bar code signal generation, a photodetector detects the presence of a light beam and generates a logical-one signal that is sustained as long as the light beam is passing over a white bar (space) of the bar code symbology. Conversely, a logical-zero signal is generated when the light pen passes over black bars of the bar code symbology because no light is impinging upon the photodetector. Like the white bar, the photodetector generates a logical-zero signal for as long as the light pen is moving over a black bar. When the light pen is moving at a relatively constant speed, the relative durations of the logical-one and logical-zero signals are representative of the relative widths of the white and black bars, respectively. However, the absolute durations of the logical-zero and the logical-one signals produced by the photodetector are dependent upon the speed with which the light pen traverses the entire bar code word. For example, the photodetector will produce signals of shorter duration the faster the light pen is moved across a bar code word. The operator defines the bar code symbology that the ASCII symbols are to be translated into by the BARCODE FORMAT 0 and BARCODE FORMAT 1 switches. In the present embodiment, the operator can select from three different bar code symbologies: Code 3 of 9, Interleaved 2 of 5 and UPC/EAN. By adding more bar code format switches a greater number of bar code symbologies could be accomodated.

An OUTPUT POLARITY SELECT switch is provided to the operator for selecting the polarity of the resulting bar code symbols output by the bar code emulator 50. For example, if the operator selected a positive polarity then a black bar would be represented by a logical-one signal level and a white bar would be represented by a logical-zero signal level.

To prevent the bar code emulator 50 from redundantly processing the same ASCII word when a RF transponder 30 remains adjacent the sensor 32, the operator can acutuate the DUPLICATE REPORT DISABLE switch. If the DUPLICATE REPORT DISABLE switch is activated, it prevents, for a defined period of time, the translation of any ASCII word that corresponds to the last ASCII word translated. If, on the other hand, the DUPLICATE REPORT DISABLE switch is disabled, then the bar code emulator 50 continues to translate ASCII words into bar code words as long as a RF transponder 30 remains within the range of sensor 32.

In the preferred embodiment of the invention, a programmable microcomputer 60 is provided for processing the various inputs and generating the required outputs in accordance with defined state of the machine. For example, if the bar code emulator 50 is in the normal operation state, then the microcomputer 60 is programmed to accept ASCII words input to it from the sensor interface 56 and output bar code words according to the inputs selected by the operator at the control interface 58. Progammable microcomputer 60 preferably includes a Motorola MC68705P5 microcomputer chip, which includes an 8-bit central processing unit (CPU), 112 bytes of random-access-memory (RAM), 1.7 Kilobytes of read-only-memory (ROM), a presettable counter-timer with a prescaler and a crystal controlled oscillator. The ROM memory, since it can only be read, contains information of an unchanging character. For example, the ROM may contain programs that specify the process for transforming an ASCII word into a bar code word. The RAM memory, unlike the ROM, is useful for containing information of a changing nature, since information can be read from and written to RAM memory.

The presettable counter-timer is useful for producing signals of varying duration, like the bar code word shown in FIG. 3. The presettable counter-timer is capable of defining varying periods of time of up to 256 units in length. A unit of time is an arbitrary length of time like, for example, a second or millisecond. For example, the counter-timer could count down from 200 units during the outputting of a logical-one signal to define a signal of a relatively long duration when compared to a logical-one signal produced by counting down from 20. Typically, a different magnitude for the unit of time is defined for each different bar code symbology. Such a value constitutes a reference or a baseline, i.e., 256 units of time or less depending upon the bar code symbology selected. In defining the reference, the shortest time duration associated with white bars and black bars of the bar code symbols for a particular bar code symbology is taken into account. For example, if the shortest time duration is 0.001 second, the number of units selected to represent bar code symbols for the particular bar code symbology is of a value to enable the 0.001 second to be represented by one or more of an integral number of pulses generated by the presettable counter-timer. If this was not the case, then the finest resolution or shortest time duration bar could not be accurately represented when translating from ASCII to bar code. The prescaler associated with the counter-timer dialates or contracts the unit time thereby changing the absolute duration of a signal. For example, a 200 unit logical-one signal where a unit is defined to be one second in length is of a longer absolute duration than a 200 unit logical-one signal where a unit is defined to be 0.5 second in duration.

The bar code emulator 50 also includes a decoder interface 62 having a SER 0 output. When the bar code emulator 50 is in the reset or power up state and, the SELFTEST ENABLE has been selected, a self test message indicating the results of the internal self tests along with various other information is output on SER 0. If the bar code emulator 50 is in the operational state, then SER 0 is used to output the bar code word produced by microcomputer 60 after processing the ASCII word input on SIG-SIG* according to the parameters specified by the operator at the control interface 58. While decoder interface 62 has but one output, SER 0, additional outputs could be added to accomodate different system configurations without departing from the scope of the present invention.

A status indicator interface 66 having a STATUS output, which is capable of driving a Light Emitting Diode (LED) or other TTL load, is included in the bar code emulator 50. During the reset or power up state and following the internal self tests, the STATUS output is toggled at a rate of 2 Hz for 2 seconds if any one of the internal self tests is failed. Consequently, if an LED is being driven by the STATUS output, the LED will flash on and off for two seconds when an internal self test is failed. When the bar code emulator 50 is in the normal operation mode and there are no ASCII symbols being processed, the STATUS output is placed in a logical-zero state. Conversely, if ASCII symbols are being processed by the bar code emulator 50 then the STATUS output is placed in a logical-one state. Therefore, if a LED is being driven by the STATUS output, the LED will be turned on and off depending on whether an ASCII symbol is being processed.

Since the bar code emulator 50 includes both analog and digital circuitry, a power and ground interface 68 is included to supply power and a ground to each type of circuitry. Exemplary of the digital circuitry requiring power and a ground is the microcomputer 60. The RF demodulator (not shown) associated with the sensor interface 56 and used to recover the ASCII symbols from the modulated RF carrier signal output by the sensor 32 is exemplary of the analog circuitry present in the bar code emulator 50 that requires a ground and a power signal.

Method of Operation

Both the reset or power up state and the normal operation state involve interaction between the various interfaces and the microcomputer 60. Upon power up of the bar code emulator 50 or a RESET at the control interface 58, the microcomputer 60 proceeds to execute internal self test programs that verify the integrity of the RAM, ROM, and the presettable counter-timer with prescaler. In addition, the microcomputer 60 executes a program which tests the sensor interface 56 by verifying the connection between the sensor 32 and the bar code emulator 50. The sensor interface test program involves, at least, the microcomputer 60 waiting for an RF carrier signal to be presented on the SIG-SIG* input pair of the sensor interface 56. Once an RF carrier signal is detected, the microcomputer 60 causes the CARDET output to be set to a logical-one state. In this fashion the connection between the sensor 32 and bar code emulator 50 is verified If any of the self tests fail, the microcomputer 60 toggles the STATUS output for 2 seconds at a rate of 2 Hz. Following completion of the self tests, the microcomputer 60 tests the status of the SELFTEST ENABLE. If the SELFTEST ENABLE switch is activated, then the microcomputer 60 forms a self test message that includes the results of the self tests and the status of the control interface 58. Once the message is compiled, the microcomputer outputs the message to the bar code decoder 52 via the SER 0 output of the decoder interface 62.

The normal operation state, like the reset or power up state, involves interaction between the interfaces and the microcomputer 60. The normal operation state can be divided into two sub-states. The first sub-state is the polling state where the microcomputer 60 and the interfaces are waiting for a valid ASCII word to be presented on the SIG-SIG* input pair of the sensor interface 56. The second sub-state, the processing state, involves the translation of a detected ASCII word according to the parameters defined at the control interface 58.

Figure 10:
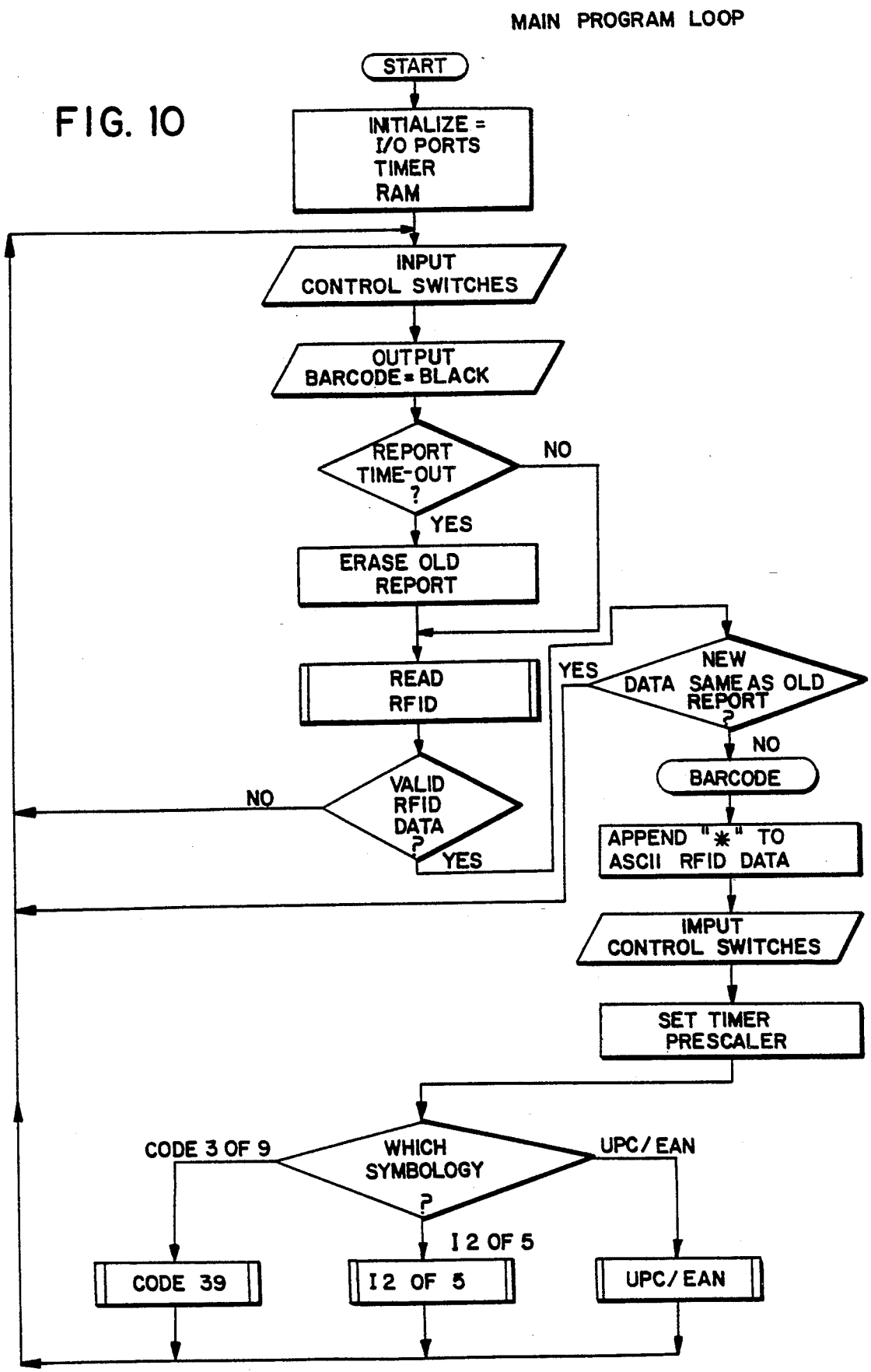
FIG. 10 is a flow chart of the main program loop associated with converting ASCII to a selected bar code.
Figure 11:
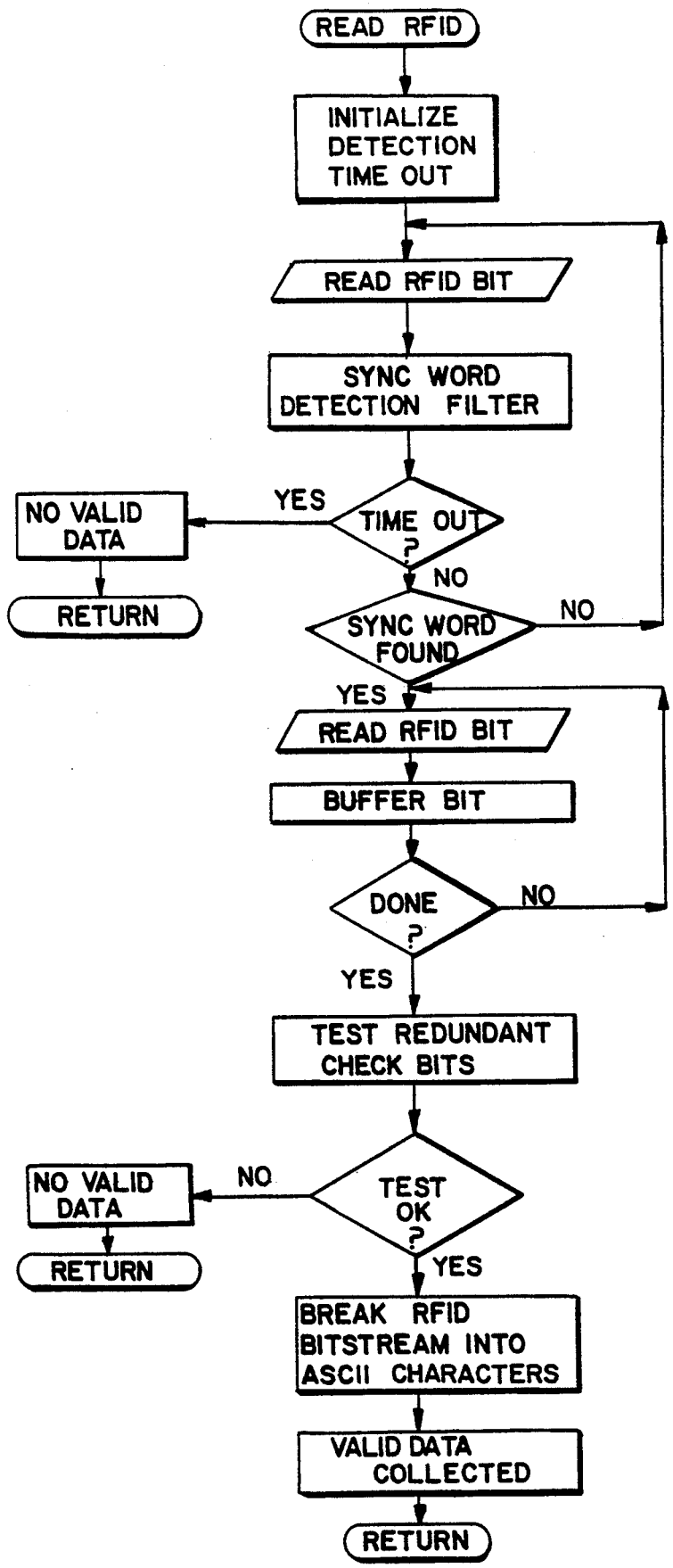
FIG. 11 is a flow chart of the program routine used in validating received ASCII.

With reference to FIGS. 10 and 11, the polling state includes the execution by the microcomputer 60 of a polling routine that holds the ENABLE output and the STATUS INDICATOR output at a logical-zero level to indicate that the bar code emulator 50 is in the polling state. The primary function of the polling routine is to interrogate the sensor interface 56 to determine if an ASCII word has been presented by the sensor 32 on the SIG-SIG* input pair. Once an ASCII word has been presented on the SIG-SIG* input pair, the polling routine proceeds to validate the word.

As previously noted, sixteen characters are available for use in the ASCII word, which is typically used as a product id. For at least some of the bar code symbologies utilized as part of the present invention, less than sixteen characters are required For example, assume the product id comprises twelve characters. In this case, the ASCII symbol or character "*" is used as the thirteenth character to indicate the end of the ASCII word. Because sixteen characters are expected, the remaining three characters can be used by the programmer for other purposes. In a preferred embodiment, the remaining characters are used to provide information as to whether or not the same product id is associated with two or more different products. The user is able to program the transponder 30 so that the last character or characters of the sixteen character information indicate that the product is different, even though the product id is the same. By way of example, the first twelve characters of the expected sixteen character representation provide the ASCII word that identifies the product, the thirteenth character is the "*" limiter, and one or more of the remaining three characters indicates that the product is different, from another product having the same product id. Restricting the ASCII words to sixteen characters and the use of a "*" to define the end of an ASCII word are not necessary and could be changed without departing from the broader aspects of the present invention. Further, when the ASCII word requires all sixteen characters for proper definition, the "*" limiter is appended as a seventeenth character to indicate the end of the bar code word.

If the ASCII word is invalid, then no further processing of the ASCII word takes place and the polling routine reverts to interrogating the sensor interface 56. If the ASCII word is valid, then the polling routine interrogates the DUPLICATE REPORT DISABLE input at the control interface 58. If the DUPLICATE REPORT DISABLE option has not been selected, then the processing state is entered and the ASCII word is translated according to the parameters specified at the control interface 58. If, on the other hand, the DUPLICATE REPORT DISABLE option has been selected, then three possible scenarios are possible. First, if the ASCII word is the same as the last ASCII word presented and the defined period of time during which translation of the same ASCII word is inhibited has not elapsed, indicated by STATUS output being held in a logical-one state, then no further processing of the ASCII word takes place and the polling routine reverts to interrogating the sensor interface 56. In the second scenario, if the ASCII word is the same as the last ASCII word presented and the defined period of time during which translation of the same ASCII word is inhibited has elapsed, as indicated by the STATUS output being in a logical-zero state, then the processing state is entered. Third, if the ASCII word is different than the last ASCII word presented, then the processing state is entered irrespective of the elapsed time. Furthermore, the STATUS output can be in either a logical-zero or a logical-one state, since the last ASCII word was processed.

Before proceeding to describe the processing state of the bar code emulator 50 in detail, the presettable counter-timer with prescaler is further described. The presettable counter-timer is capable of being set to define periods of time ranging from 0 to 256 units, with the set or established time corresponding to a baseline or reference time. For example, a bar code symbol could be defined using the full 256 units of time duration. If a bar code symbol is composed therefore of two white bars that are half as thick as the two black bars that separate them, then the relative duration of the signals representative of the white bars would be approximately 43 units and the relative duration of the signals representative of the black bars would be approximately 86 units. Such units of time find correspondence in a particular signal frequency, which is a reference or baseline frequency. As previously noted, in the embodiment that accommodates emulating different wand speeds, the baseline time duration associated with a particular bar can be modified by the prescaler to emulate a particular wand speed. For example, a wand moving at a speed of 4 in/s, because it is passing over the bar code word relatively slowly, produces signals of greater absolute duration than a wand moving at a speed of 64 in/s. The prescaler is used in contracting the reference frequency established using the presettable counter-timer.

Figure 12:
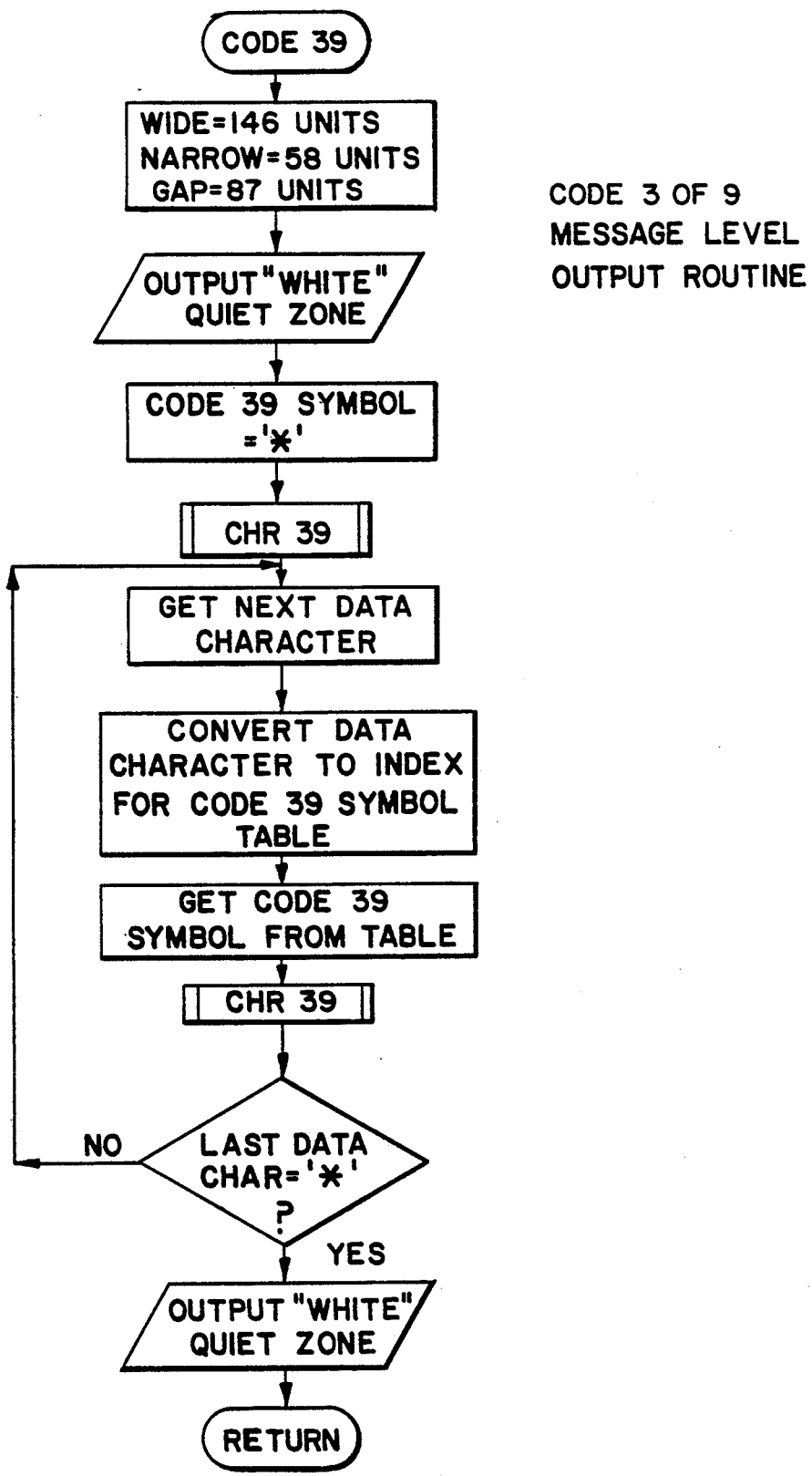
FIG. 12 is a flow chart of the high-level process for translating ASCII to Code 3 of 9.
Figure 13:
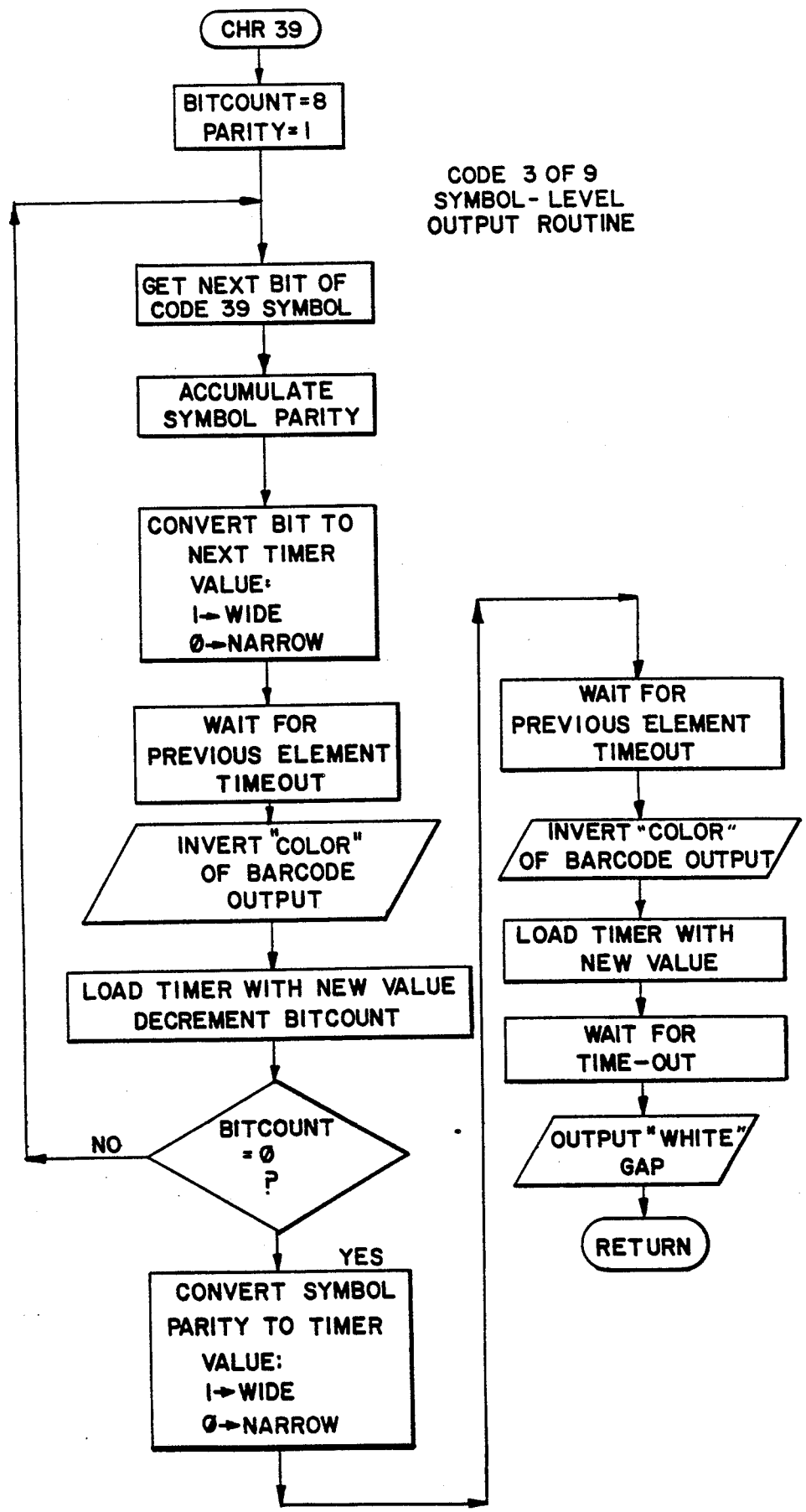
FIG. 13 is a flow chart of the low level process for translating discrete ASCII into Code 3 of 9.
Figure 14:
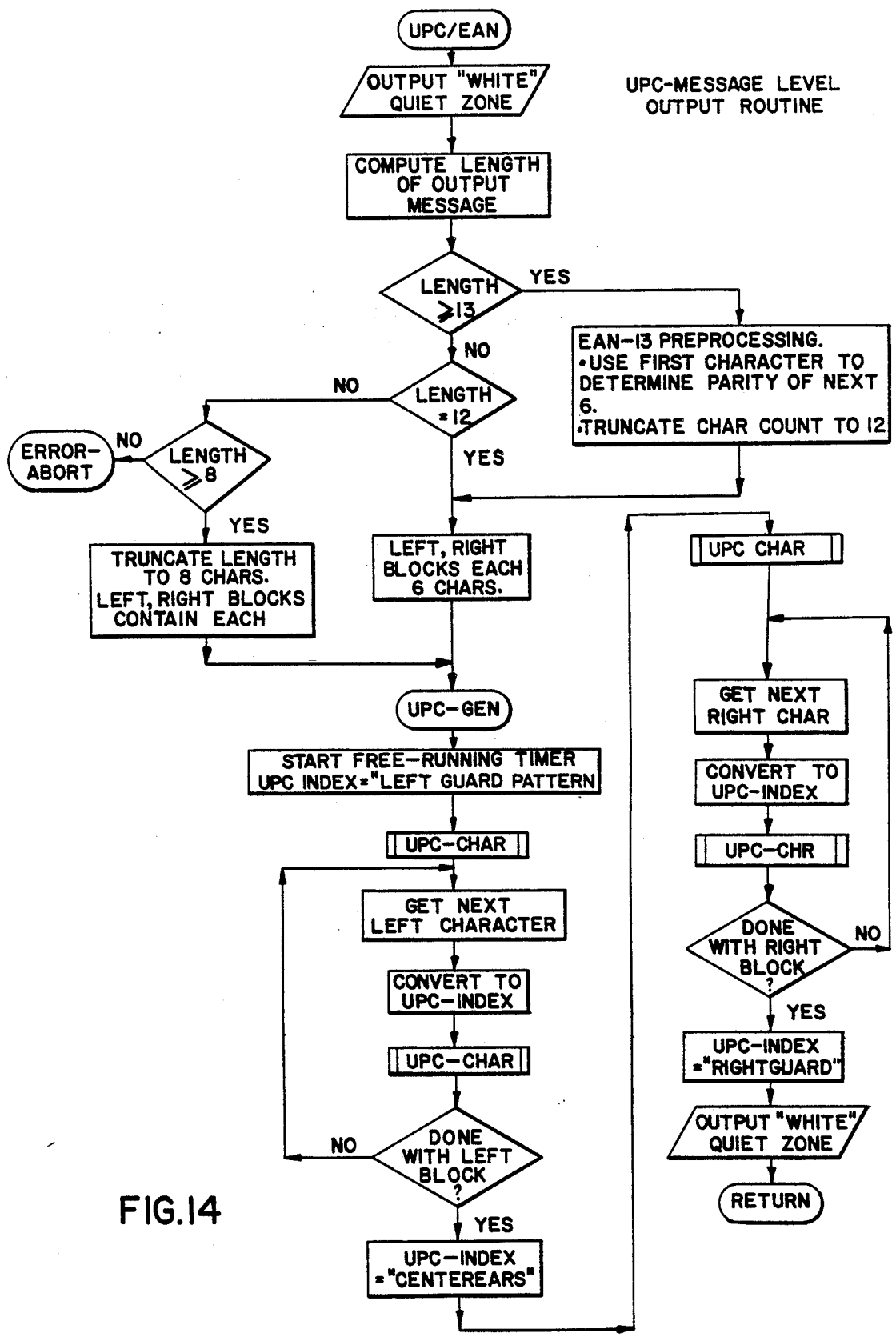
FIG. 14 is a flow chart of the high-level process for determining, among other things, which version of the UPC/EAN symbology is being used.
Figure 15:
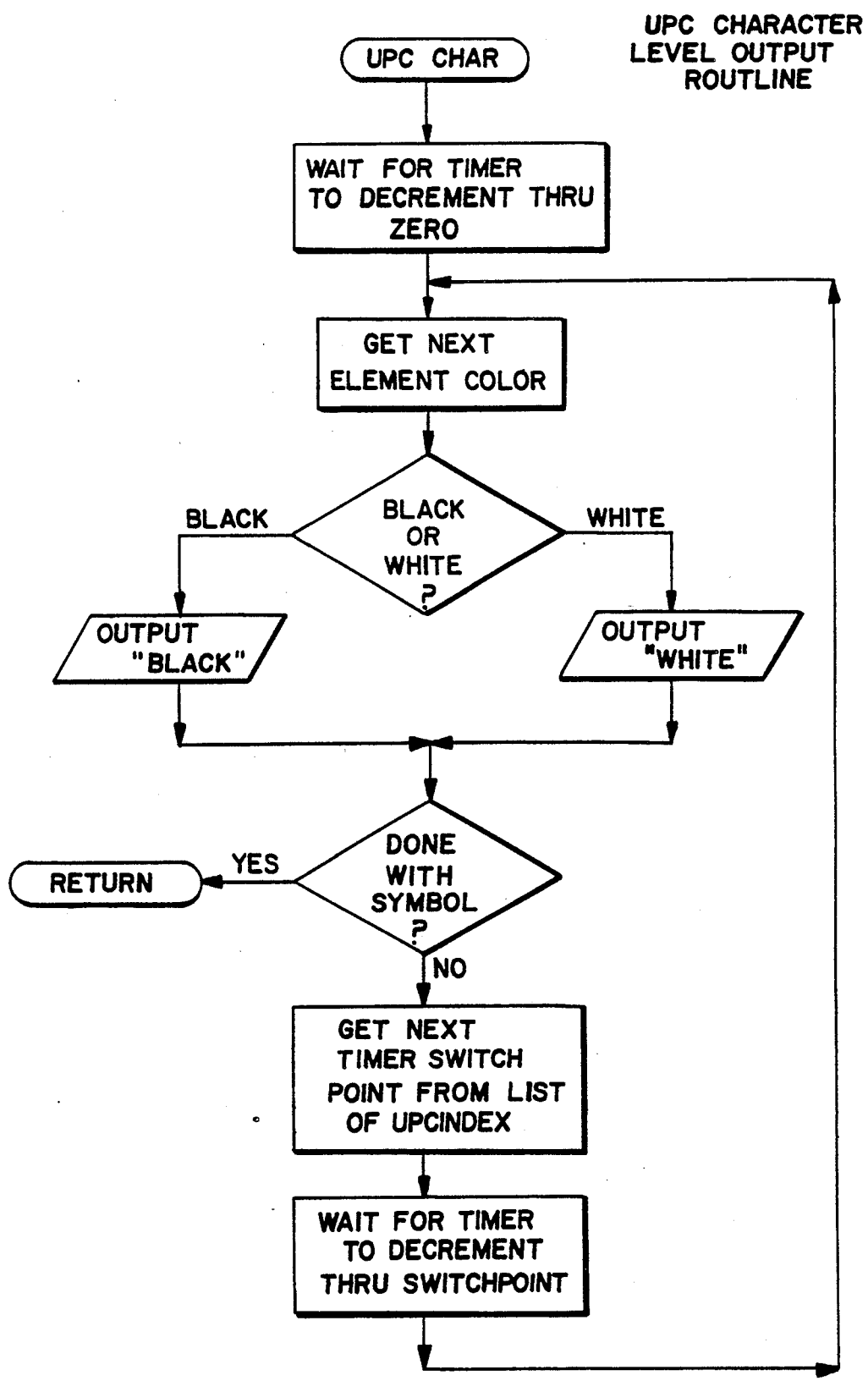
FIG. 15 is a flow chart of a lower-level process for translating ASCII to UPC/EAN.

Upon entering the processing state, the ENABLE output of the sensor interface is held at a logical-one state to indicate to the sensor 32 that the ASCII symbol is being processed. Next, with reference to FIG. 10, the microcomputer 60 executes the BARCODE routine. The BARCODE routine initially establishes the prescale value, used by the presettable counter-timer, according to the settings of the BARCODE DATA RATE 0 and BARCODE DATE RATE 1 switches. The BARCODE routine also decodes the BARCODE FORMAT 0 and BARCODE FORMAT 1 inputs to determine the symbology into which the ASCII word is to be translated. If the Code 3 of 9 bar code symbology is selected, then the BARCODE routine calls the CODE 39 subroutine (FIG. 12) to, in conjunction with the CHR 39 subroutine (FIG. 13), translate the ASCII word into the Code 3 of 9 bar code symbology. In a similar fashion and with reference to FIGS. 14-15, the ASCII word is translated into UPC/EAN bar code symbology using the subroutines: UPC/EAN, UPC-GEN and UPC-CHAR. The SER 0 output, associated with the decoder interface 62, is used to transmit the bar code words in the desired bar code symbology to the bar code decoder 52. Furthermore, the signals that comprise the bar code words are of the polarity and duration specified at the control interface 58.

The CODE 39 and CHR39 routines define the process for translating an ASCII word into a Code 3 of 9 bar code symbology word. (A description of the translation of ASCII words into the Interleaved 2 of 5 bar code symbology is not included because it is quite similar to the Code 3 of 9 translation and its format is well-defined in the art). While the following description constitutes the preferred process for generating Code 3 of 9 bar code words from ASCII words, the order and manner of accomplishing various steps in the process could be changed without departing from the scope of the present invention. The BARCODE routine, upon determing that the ASCII words are to be translated into Code 3 of 9 words, initially calls the CODE 39 subroutine. The CODE 39 subroutine produces the initial quiet zone, a logical-zero signal output for a defined period of time and required by the Code 3 of 9 format. The relative duration of the signals representative of the wide bars, narrow bars and gaps (an intersymbol white bar) that comprise a Code 3 of 9 symbol are established. The CODE 39 subroutine then calls the CHR39 subroutine to generate signals that represent a special start/stop character that is required by the Code 3 of 9 symbology. This character is not part of the received ASCII word. However, the generation of the bar code symbol for this special character is performed in substantially the same manner as the subsequent generation of bar code symbols for the characters of the received ASCII word. The CODE 39 subroutine next obtains the Code 3 of 9 representation for the first character of the received ASCII word. By way of example, the character may be the capital letter "A", a character for which the Code 3 of 9 symbology defines a unique bar code symbol. The subroutine establishes an index to the lookup table that defines the composition of the Code 3 of 9 signals that represent the character "A" and calls subroutine CHR39 to generate the signals representative of the character "A". The index is typically the binary representation of the ASCII symbol or a multiple thereof. Adding the index to the base address of the lookup table produces the address of a memory location that contains information that defines the composition of the Code 3 of 9 signals that represent the ASCII "A". For example, the indexed entry for the Code 3 of 9 signals that represent the character "A" consists of a wide bar, a narrow space (white bar), a narrow bar, a narrow space, a narrow bar, a wide space, a narrow bar, a narrow space and a wide bar that is finally followed by a gap. In this fashion the CODE 39 subroutine processes each character associated with the ASCII word, i.e., translates each character and generates its equivalent bar code symbol. When the end of the ASCII word is reached, one last bar code symbol, the start/stop symbol, is output followed by a quiet zone. Once the entire bar code word is output on the decoder interface 62, the microcomputer 60 returns to the polling routine to await the receipt of another ASCII word.

The look-up table is preferably constructed in the following manner for the Code 3 of 9 symbology. The Code 3 of 9 symbology requires the definition of only two relative durations for the two types of elements comprising a Code 3 of 9 symbol. The relative durations are conveniently represented by two 8-bit integer constants in ROM memory identified as "Narrow" and "Wide." For example, the value of Narrow may be 100 units while the value of Wide may be 250 units. In addition, all Code 3 of 9 symbols contain exactly three wide elements and six narrow elements. Consequently, if relative durations of the first eight elements of a given symbol are known, the relative duration of the ninth element is determinable. Furthermore, by definition; each symbol begins with a bar (a block element) and thereafter bars alternate with spaces (white elements). An efficient table entry that, in conjunction with the above-mentioned Narrow and Wide constants, determines the relative durations of all elements of a given symbol may be constructed as a single byte of eight bits. The value, logical-one or logical-zero, of each bit, from most significant, to least significant represents the relative duration, Narrow or Wide, of the first eight elements of the symbol. Continuing the previously set out example, the table entry for the character "A" would consist of a single byte having the binary representation 10000100. Once the CHR39 subroutine is given an index to the look-up table, it obtains the table entry byte corresponding to the index. It examines the bit corresponding to the first element (which is a black bar) and determines the value, logical-one or logical-zero, of that bit. If the value of the bit is a one, as in the example, then the value of the Wide constant is used to preset the presettable counter-timer. As part of the presetting, the value of the prescaler is also taken into account. Specifically the frequency of the counter-timer is modified using the prescaler, which reflects the wand speed being simulated. For example, to simulate a wand speed of 16 in/s, the frequency at which the counter-timer decrements from 250 units is adjusted using the prescaler to be four times faster than if a wand speed of 4 in/s were being simulated.

At this time also, the output SER 0 of the decoder interface 62 is set to the logical value for the first bar code element, a logical-one or a logical-zero, required by the output polarity selection specified at the control interface 58. The subroutine then monitors the output of the presettable counter-timer, which is an integer decrementing from the preset value, Wide, toward zero. When the value of the output of the presettable counter-timer passes zero, the CHR39 subroutine begins processing, in a like manner, the bit of the current table entry corresponding to the second symbol element. In the example, this bit is a logical-zero and corresponds to a narrow bar code element. This requires that the presettable counter timer be preset with the value of the constant narrow constant and modified by the prescaler to reflect the simulated wand speed. Since the first element was a bar or black element, the second element is necessarily a space or white bar. Each of the eight elements explicitly encoded by the table entry is output in turn. The ninth element is determined to be a wide black element, since only two of three wide elements contained in the current symbol have been output. The CHR39 subroutine then generates a gap, an intercharacter wide element of known relative duration. This completes the processing for one Code 3 of 9 symbol corresponding to a received ASCII character. Remaining ASCII characters are processed for the Code 3 of 9 symbology in the same manner.

The UPC/EAN, UPC-GEN and UPC-CHAR subroutines define the process for translating an ASCII word into a UPC/EAN bar code symbology word. While the following description constitutes the preferred process for generating UPC/EAN bar code words from ASCII words the order and manner of accomplishing various steps in the process could be changed without departing from the scope of the present invention. The BARCODE routine, upon determining that the ASCII words are to be translated into a UPC/EAN symbology, initially calls the UPC/EAN subroutine. Among the functions of the UPC/EAN subroutine are the setting of the prescaler according to the BARCODE DATA RATE 0 and BARCODE DATA RATE 1 switches and the generating of the initial quiet zone, a logical-zero signal output for a defined length of time, and required for all UPC/EAN bar code symbologies. The UPC/EAN subroutine also, based on the length of the ASCII word presented, determines which UPC/EAN bar code symbology (EAN-8, UPC version A or EAN-13) is being used. Based on which UPC/EAN bar code symbology is being used, the UPC/EAN subroutine initializes various data structures used by the UPC-GEN and UPC-CHAR subroutines. The UPC/EAN subroutine, upon completing this task, calls the UPC-GEN subroutine to generate the UPC/EAN bar code word. The UPC-GEN subroutine generates an index into a lookup table that specifies the durations of the logical-one and logical-zero signals that comprise and represent a UPC/EAN symbol, defines various other information necessary to generate the signals, and calls the UPC-CHAR to manage the generation of the signals representative of each individual UPC/EAN bar code symbol. The index is typically the binary representation of the ASCII symbol or a multiple thereof. For example, the UPC-GEN subroutine generates signals representative of the left guard bars by setting the counter-timer to 256 counts and indicating the index to the look-up table entry which defines the order and duration of the logical-one and logical-zero signals which represent the left guard bar pattern. Once this information is established, the UPC-GEN subroutine calls the UPC-CHAR subroutine, which actually manages the generation of the left guard bar symbol. In this fashion, the symbols to the left of the center bar, the center bar, the symbols to the right of the center bar and the right guard bars are generated. Once the entire ASCII word is translated and output on the decoder interface 62, the microcomputer 60 returns to the polling routine to await the presentation of another ASCII word.

The look-up table associated with UPC symbologies is constructed differently than the Code 3 of 9 symbology. Specifically, because of the relatively strict tolerances imposed by the UPC symbology and relative durations of the overall word, symbol, and elements, it is preferred to avoid repetitively presetting the presettable counter-timer as is done in Code 3 of 9 symbology. Such presetting usually leads to cumulative timing errors due to the asychronous concurrent operation of the program flow with respect to the counter-timer operation. Additionally, in the UPC symbology, the elements contained in the various character symbols having a large variation in width that requires a relatively large number of corresponding relative durations be specified for the signals representing a UPC symbol. Therefore, the symbol look-up table for the UPC symbology is preferably constructed as a more general data structure than that described for the Code 3 of 9 symbology. Such a look-up table may be constructed of a series of entries, with each entry pointing to a list that corresponds to a particular UPC character or symbol and consists of several bytes. Each byte in a particular list contains the value of the presettable counter-timer that, if left to run freely, marks the appropriate time to end one bar code element of a symbol and begin another. Each list is constructed so that each character or symbol is defined to require exactly 256 base units of time and the values of the bytes corresponding to the beginning of each new element of each symbol are independent of any symbols previously generated.

For example, the list corresponding to the UPC symbol for the numeric character "2" consists of three bytes with the integer values 180, 146, 70. This is interpreted to mean that the first element of the symbol "2" ends when the presettable counter-timer, decrementing from 255, passes the value 180. At this point, it is known that the second bar code element starts. The second bar code element ends when the value of the presettable counter-timer passes the value 146. Similarly, the third bar code element ends when the presettable counter-timer passes the value 70. The fourth and last element of the symbol is implicitly defined to end when the presettable counter-timer passes the value 0. At this point, the presettable counter-timer, being allowed to run freely, decrements through 0 and begins to decrement again from 255. Similar to the Code 3 of 9 symbology, the frequency at which the counter-timer decrements from 255 is controlled by the magnitude of the prescaler, which corresponds to the simulated wand speed.

The UPC-CHAR subroutine, using the value of the index passed to it from the UPC-GEN routine, obtains the list for a received ASCII character. The subroutine processes each byte in the list by monitoring the output of by the presettable counter-timer and obtaining the value of the next byte in the list (corresponding to a new bar code element) as the presettable counter-timer decrements past the value of the byte in the list that is presently being processed. Once the processing required to generate a single UPC character is complete, the subroutine returns to the UPC-GEN routine.

The manner in which the microcomputer 60 generates the relative and absolute durations for the bar code elements (bars or spaces) of a given bar code symbol associated with a given received ASCII word is implemented by software look-up tables containing information relevant to the operation of the presettable counter-timer with prescaler. In the preferred embodiment of the invention, the look-up table structure is different for each of the separate symbologies, reflecting differences between the symbologies in timing tolerances and in memory requirements. As a consequence of these differences in table structure, the appropriate base unit of duration of the presettable counter-timer, defined here to be the amount of real time required for the presettable counter-timer to decrement once, depends upon the particular symbology as well as the inputted, emulated wand speed. The appropriate base unit of time being thus determined is selected by writing a particular value to the prescaler. The duration of each bar code element is then defined as an integer multiple of the presettable counter-timer base unit. These relative durations are defined by the symbol look-up tables as previously described.

It should also be understood from the foregoing that, because of the greater number of bar code elements for the Code 3 of 9 symbology (nine bar code elements) as opposed to a UPC character symbol (four bar code elements), it is preferred that the Code 3 of 9 symbology not use the same look-up table technique as the UPC routine because a relatively less precise definition of the relative element durations would result. In addition, nine bytes of information per character would be needed to store each CODE 39 character symbol as opposed to one byte for the preferred technique. Considering the large number of distinct CODE 39 symbols, the large number of elements per symbol, and the relatively small amount of ROM available in the MC 68705P5 microcomputer, the preferred scheme constitutes a significant memory savings. However, neither of these points is a major obstacle if a faster microcomputer with a larger (i.e. more bits) counter-timer were used, as well as more available ROM and RAM. In such a case, it would be practical to make the algorithms and data structures for all of the symbologies identical and they would have been fashioned along the same lines as the UPC algorithm, although possibly the list of timer switch points would be compiled by software for an entire bar code word in the most general case.

EXAMPLE OF OPERATION

As an example of the operation of the bar code emulator 50, assume the normal operation state with the microcomputer 60 executing the polling routine and the following interface status:

STATUS - logical-zero indicating that there has been a timeout for duplicate reports;

ENABLE - logical-zero indicating that no ASCII words are being processed.

Suppose that an operator has selected the following inputs at the control interface 58:

DUPLICATE REPORT DISABLE—enabled;

BARCODE FORMAT 0 and 1—set to UPC/EAN; and

BARCODE DATA RATE 0 and 1—set to 16 in/s.

Further, suppose the following input at sensor interface 56:

SIG-SIG*—an RF signal modulated by the ASCII symbology representation of the product id "012345678905".

The RF signal is demodulated by the circuitry within sensor interface 56 and presented to the microcomputer 60. In accordance with the polling routine, the ASCII word is verified, compared to the last ASCII word, and translated in accordance with the selected DUPLICATE REPORT DISABLE option. Assuming that the ASCII word is verified and it does not compare to the last ASCII word translated, then the processing state is entered with the following interface status:

ENABLE—set to a logical-one state to inform the sensor 32 that an ASCII word is being processed.

The microcomputer 60 then commences executing the BARCODE routine, which initially sets the prescaler according to the BARCODE DATA RATE 0 and BARCODE DATA RATE 1. Subsequently, the BARCODE routine decodes the BARCODE DATA FORMAT 0 and BARCODE DATA FORMAT 1 inputs and determines that the UPC/EAN subroutine should be called. The UPC/EAN subroutine determines which version of the UPC/EAN symbology is being used and then calls the UPC-GEN subroutine. The UPC-GEN subroutine is the high-level routine for translating ASCII words to UPC/EAN words of the required version. In the process of translating ASCII words to UPC/EAN words, the UPC-GEN subroutine calls the UPC-CHAR subroutine to translate individual ASCII symbols to UPC/EAN symbols. The following translated UPC/EAN symbology representation of the product id "012345678905" is output on the decoder interface 62:

SER 0—substantially similar to that shown in FIG. 3.

Once translation is complete, processing reverts back to the polling routine and the following interface status is present:

STATUS—logical-one indicating that the Duplicate Report timeout is present; and

ENABLE—logical-zero indicating that no ASCII words are being processed.

Assume now that the same ASCII word is presented. The polling routine, subsequent to verification, compares the new ASCII word to the old ASCII word and finds them to be identical. Next, the polling routine determines if the time for inhibiting the processing of duplicate ASCII words has expired. If the allotted time has not expired then the new ASCII word is rejected and the polling routine waits for another new ASCII word. If the allotted time has expired then the new ASCII word is processed in the same manner as the old ASCII word.

Based on the foregoing description, important features of the present invention are readily discerned. An apparatus is provided for converting non-bar code information to bar code. Preferably, the non-bar code information is in the form of ASCII words. A RFID transponder is utilized to avoid problems that can arise in an environment unsuitable for modulated light input from a wand or the like. The emulator of the present invention relies on look-up tables each of which is associated with one of a number of bar code symbologies, that are used to determine corresponding bar code signal for a particular ASCII word or symbol. The look-up table provides information relating to relative durations of time associated with the occurrence of white and black bars in defining the bar code word corresponding to the particular ASCII word or symbol. Further, the present invention enables the user to emulate wand speed and controls or modifies a counter-timer in achieving the ability to emulate different wand speeds. Additionally, the apparatus, in conjunction with the transponder, enables the user to program information that permits distinguishing the same products having the same product id. This is accomplished by utilizing characters different from the product id characters. Moreover, the present invention provides subroutines for effectively and efficiently converting the ASCII word to a selected one of a number of bar code symbologies.

Although the present invention has been described with reference to a particular embodiment, it should be readily understood that variations and modifications can be effected within the spirit and scope of the invention.

What is claimed is:

1. An apparatus for use in translating a first signal representative of a symbol in a non-bar code symbology into a second signal representative of said symbol in a bar code symbology, comprising:
    first means for providing a first signal representative of a symbol in a non-bar code symbology; and
    second means for receiving said first signal, translating said first signal into a corresponding second signal representative of said symbol in a bar code symbology, and transmitting said second signal to a device that is responsive to signals representative of said symbol in said bar code symbology;
    wherein said first means includes means for providing a carrier signal and means for providing information that relates to said symbol and that is used to modulate said carrier signal to produce said first signal.

2. An apparatus as claimed in claim 1, wherein:
    said non-bar code symbology includes ASCII symbology.

3. An apparatus, as claimed in claim 1, wherein:
    said second means includes look-up table means for use in translating said first signal into said second signal.

4. An apparatus, as claimed in claim 1, wherein:
    said second means includes a presettable counter-timer for use in controlling the duration of said second signal so that said second signal can be applied to said device, wherein said device is adapted to receive said second signal within a defined time.

5. An apparatus, as claimed in claim 1, wherein:
    said second means includes a prescaler for use in controlling the duration of said second signal so that said second signal can be applied to the device, wherein the device is adapted to receive said second signal within a defined time.

6. An apparatus, as claimed in claim 1, wherein:
    said second means includes means for providing information relating to the relative widths of white and black bars used to represent said symbol in said bar code symbology.

7. An apparatus, as claimed in claim 1, wherein:
    said second means includes means for specifying a polarity of elements comprising said second signal, wherein the device is adapted to receive said signal with a specific polarity.

8. An apparatus, as claimed in claim 1, wherein:
    said second means includes computer means having a program for use in translating said first signal into said second signal.

9. An apparatus, as claimed in claim 1, wherein:
    said second means includes means for selecting one of a plurality of bar code symbologies.

10. An apparatus for use in translating a first signal representative of a symbol in a non-bar code symbology into a second signal representative of said symbol in a bar code symbology, comprising:
    first means for providing a first signal representative of a symbol in a non-bar code symbology; and
    second means for receiving said first signal, translating said first signal into a corresponding second signal representative of said symbol in a bar code symbology, and transmitting said second signal to a device that is responsive to signals representative of said symbol in said bar code symbology;

wherein said first means includes transponder means that is associated with an object and sensor means, wherein said transponder means, in response to a third signal from said sensor means, transmits said first signal to said sensor means which then provides said first signal to said second means.

11. An apparatus for converting a product identification signal represented in a non-bar code symbology into a signal represented in a bar code symbology, comprising:

first means, associated with a product, for transmitting a non-bar code modulated product identification signal;

second means, responsive to said first means, for sensing said non-bar code modulated product identification signal;

third means, responsive to said second means, for demodulating said non-bar code modulated product identification signal to produce a non-bar code demodulated product identification signal; and fourth means for translating said non-bar code demodulated product identification signal into a corresponding bar code signal with said bar code signal including a number of bar-code signal elements, wherein said fourth means controls the duration of said bar code signal elements so that said bar code signal can be applied to a device adapted to receive bar code signals from a light-oriented transducer scanning a bar code symbol comprised of bar code elements having defined widths at a particular speed and producing a bar code signal comprised of bar code signal elements having a duration determined by said defined widths of said bar code symbol elements and the particular speed at which said lightoriented transducer scans said bar code symbol elements.

12. An apparatus, as claimed in claim 11, wherein: said fourth means for translating includes means for providing the relative duration of each of said bar code signal elements comprising said bar-code signal.

13. An apparatus, as claimed in claim 11, wherein: said non-bar code modulated product identification signal includes ASCII information.

14. An apparatus, as claimed in claim 13, wherein: said fourth means for translating includes look-up table means for correlating ASCII symbology with a bar code symbology.

15. An apparatus, as claimed in claim 11, wherein: said fourth means further includes means for adjusting the polarity of said bar-code signal elements comprising said bar code signal so that said bar code signal is compatible with the device.

16. An apparatus, as claimed in claim 11, wherein: said fourth means includes means for selecting one of a plurality of bar codes so that said bar code signal is compatible with the device.

17. A method for providing bar code signals representative of the identity of a product, comprising:
providing a product having a non-bar code product identifier;
transmitting a non-bar code product identification signal representative of said non-bar code product identifier;
sensing said non-bar code product identification signal; and
translating said sensed non-bar code product identification signal into a corresponding bar code signal, said bar code signal having as number of bar code signal elements, wherein said step of translating includes providing for an absolute duration of each of said bar code signal elements so that said bar code signal can be applied to a device designed to receive bar code signals having bar code signal elements with defined durations.

18. A method, as claimed in claim 17, wherein: said step of translating includes selecting the type of said bar code symbology from a number of types of bar code symbologies so that bar code signal can be processed by the device.

19. A method, as claimed in claim 17, wherein: said step of translating includes specifying the relative duration of each of said bar code signal elements comprising said bar code signal so that said bar code signal can be processed by the device.

20. A method, as claimed in claim 17, wherein: said step of translating includes specifying a polarity for said bar code signal elements comprising said bar code signal so that said bar code signal elements can be processed by the device.

21. A method, as claimed in claim 17, wherein: said non-bar code includes ASCII.

22. A method, as claimed in claim 17, wherein: said product identification signal includes a plurality of characters for identifying a first product and at least one other character for distinguishing said first product from other products with each such other products being represented by a product identification signal having the same plurality of characters for identifying as the first product but without said at least one other character for distinguishing.

23. A method, as claimed in claim 17, wherein: said step of translating includes accessing a look-up table that correlates said non-bar code and said bar code.

24. A method, as claimed in claim 17, wherein: said step of providing for an absolute duration includes using a reference relating to time associated with said corresponding bar code symbol.

25. A method, as claimed in claim 17, wherein: said step of providing for an absolute duration includes selecting a value relating to the speed of a light-oriented transducer that produced a bar code signal having bar code signal elements with durations determined by the speed at which said light-oriented transducer scans a bar code symbol comprised of bar code symbol elements.

26. An apparatus for use in adapting bar code processing machinery to environments where light-oriented transducers are substantially ineffective in reading bar codes, comprising:
first means, associated at least in part with an object, for transmitting a radio signal that provides information relating to the object; and
second means for receiving said radio signal, processing said radio signal to produce a first signal that can be applied to a device responsive to bar code signals, and transmitting said first signal to the device.

27. An apparatus, as claimed in claim 26, wherein: said first means includes sensor means for providing a second signal and transponder means, responsive to said second signal, for providing said radio signal to said sensor means which, in turn, provides said radio signal to said second means.

28. An apparatus, as claimed in claim 26, wherein:
said first means includes means for modulating said radio signal to provide information relating to said object.

29. An apparatus, as claimed in claim 28, wherein:
said second means includes means for demodulating said radio signal to recover the information relating to the object.

30. An apparatus, as claimed in claim 26, wherein:
said first means includes means for modulating said radio signal according to a non-bar code symbology to provide information relating to the object.

31. An apparatus, as claimed in claim 30, wherein said non-bar code symbology includes ASCII symbology.

32. An apparatus, as claimed in claim 30, wherein:
said second means includes means for demodulating said radio signal to recover the information relating to the object.

33. An apparatus, as claimed in claim 26, wherein:
said radio signal includes non-bar code information relating to the object.

34. An apparatus, as claimed in claim 26, wherein:
said second means includes means for providing the duration of said first signal so that said first signal is compatible with the device.

35. An apparatus, as claimed in claim 26, wherein:
said second means includes means for adjusting the polarity of said first signal so that said first signal is compatible with the device.

36. An apparatus, as claimed in claim 26, wherein:
said second means includes means for selecting one of a plurality of bar codes symbologies so that said first signal is compatible with the device.

37. An apparatus for use in adapting bar code processing machine to environments where light-oriented transducers are substantially ineffective in reading bar codes, comprising:
first means, associated with an object, for transmitting a radio signal including a non-bar code signal that provides information relating to the object; and
second means for receiving said radio signal, translating said non-bar code signal into a bar-code signal, and transmitting said bar code signal to a device responsive to bar code signals.

38. An apparatus, as claimed in claim 37, wherein:
said non-bar code signal includes ASCII symbology.

39. An apparatus, as claimed in claim 37, wherein:
said second means includes means for adjusting the duration of said bar code signal so that said bar code signal is compatible with the device.

40. An apparatus, as claimed in claim 37, wherein:
said second means includes means for adjusting the polarity of said bar code signal so that said bar code signal is compatible with the device.

41. An apparatus, as claimed in claim 37, wherein:
said second means includes means for selecting one of a plurality of bar code symbologies so that said bar code signal is compatible with the device.

* * * * *